United States Patent
Sako et al.

(10) Patent No.: US 6,300,395 B1
(45) Date of Patent: *Oct. 9, 2001

(54) AQUEOUS HYDROPHILIZATION TREATMENT COMPOSITION AND METHOD FOR ALUMINUM-CONTAINING METAL MATERIAL

(75) Inventors: Ryosuke Sako; Tomohiro Ohsako; Tatsuo Hibino, all of Tokyo (JP)

(73) Assignee: Nikon Parkerizing, Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/567,491

(22) Filed: Dec. 5, 1995

(30) Foreign Application Priority Data

Dec. 7, 1994 (JP) .................................................... 6-303674

(51) Int. Cl.[7] .................................................... C08K 5/47
(52) U.S. Cl. ........................... 524/84; 523/122; 523/402; 523/404; 523/414; 523/417; 523/420; 523/424; 523/403; 524/87; 524/92; 524/93; 524/99; 524/208; 524/407; 524/413; 524/106; 524/110; 524/168; 524/172; 524/177; 524/199; 524/202; 524/260; 524/324; 524/341; 524/343; 524/405
(58) Field of Search .................................. 524/514, 172, 524/53, 177, 405, 407, 208, 413, 84, 87, 99, 92, 93, 106, 110, 199, 202, 260, 168, 324, 341, 343; 523/420, 424, 122, 414, 406, 402, 410, 404, 4, 3, 417, 403

(56) References Cited

U.S. PATENT DOCUMENTS

| | | | |
|---|---|---|---|
| 3,318,972 | 5/1967 | Mertzweiller et al. | 260/836 |
| 3,969,300 * | 7/1976 | Nagata et al. | 523/410 |
| 3,988,281 * | 10/1976 | Minami et al. | 523/410 |
| 3,988,294 * | 10/1976 | Hill | 424/322 |
| 4,454,264 * | 6/1984 | Patzschke et al. | 523/410 |
| 4,624,679 * | 11/1986 | McEntee | 8/650 |
| 4,686,249 * | 8/1987 | Diefenbach et al. | 523/410 |
| 4,865,704 * | 9/1989 | Saatweber et al. | 523/410 |
| 4,954,372 * | 9/1990 | Sako et al. | 427/388.2 |
| 4,988,759 * | 1/1991 | Den Hartog et al. | 524/531 |
| 5,009,962 | 4/1991 | Yamasoe | 428/470 |
| 5,096,958 | 3/1992 | Meguro . | |
| 5,312,654 * | 5/1994 | Arimatsu et al. | 427/511 |
| 5,324,812 * | 6/1994 | Speranza et al. | 528/338 |
| 5,405,701 * | 4/1995 | Fujibayashi et al. | 523/410 |
| 5,523,363 * | 6/1996 | Fujibayashi et al. | 523/410 |
| 5,538,078 * | 7/1996 | Mizuno et al. | 165/133 |

FOREIGN PATENT DOCUMENTS

| | | |
|---|---|---|
| 1 544 713 | 6/1969 | (DE) . |
| 2 163 660 | 7/1973 | (DE) . |
| 0 290 676 | 11/1988 | (EP) . |
| 0 409 130 A1 | 1/1991 | (EP) . |
| 0 541 169 | 5/1993 | (EP) . |
| 0 606 762 | 7/1994 | (EP) . |
| 0 654 514 A1 | 5/1995 | (EP) . |
| A-50-157233 | 12/1975 | (JP) . |
| 50332 * | 5/1976 | (JP) .................................... 524/531 |
| A-54-142650 | 11/1979 | (JP) . |
| A-60-101156 | 6/1985 | (JP) . |
| A-60-219285 | 11/1985 | (JP) . |
| A-61-250495 | 11/1986 | (JP) . |
| 63061006 * | 3/1988 | (JP) . |
| 90-309600/41 | 9/1990 | (JP) . |
| A-2-219875 | 9/1990 | (JP) . |
| A-3-72562 | 3/1991 | (JP) . |
| WO 92/17543 | 10/1992 | (WO) . |

OTHER PUBLICATIONS

French Search Report, dated Apr. 22, 1997.

* cited by examiner

Primary Examiner—Judy M. Reddick
(74) Attorney, Agent, or Firm—Manelli Denison & Selter; Paul E. White, Jr.

(57) ABSTRACT

A hydrophilic coating having excellent hydrophilicity, which can prevent offensive odor generation, and which has a good antibacterial performance and formability, is formed on an aluminum-containing metal material by coating an aqueous hydrophilization treating liquid containing (A) a glycidyl group-containing, water-soluble organic compound; (B) a water-soluble polymeric or polymerizable compound having a tert-amino group and at least one hydrophilic functional group selected from sulfonic, phosphonic, carboxyl, polyalkyleneglycol, hydroxyl and amide groups; and (C) an antibacterial agent not decomposing at 100° C. or lower, on an aluminum-containing metal material; and heat-drying the coated liquid.

2 Claims, No Drawings

AQUEOUS HYDROPHILIZATION TREATMENT COMPOSITION AND METHOD FOR ALUMINUM-CONTAINING METAL MATERIAL

BACKGROUND OF THE INVENTION

1. Field of the Invention

The present invention relates to an aqueous hydrophilization treatment composition and method for an aluminum-containing metal material. More particularly the present invention relates to an aqueous hydrophilization treatment composition and method for an aluminum-containing metal material usable in heat exchangers, for example, evaporators for car air-conditioners and in parts for the heat exchangers.

2. Description of the Related Art

It is known that almost all of the conventional heat exchangers made from an aluminum-containing metal material are designed so that the surface areas of heat-dissipation surface portions and heat absorption (cooling) surface portions (fins) are made as large as possible to enhance the heat dissipation effect and thus the cooling effect of the heat exchangers.

Also, it is known that to make the size of heat exchangers as small and compact as possible, the gaps between the fins are made very small. Accordingly, when the conventional heat exchangers work, moisture in the ambient air is condensed in the fin gaps. In this moisture condensation phenomenon, the higher the degree of hydrophobic property of the fin surfaces, the easier the formation of water drops from the condensed water on the fin surfaces, and thus the fin gaps are blocked by the water drops. The blockade of the fin gaps results in an increase in resistance to air flow and thus in a decrease in heat-exchange efficiency. Also, the water drops formed between the fin gaps are scattered into the downstream side of the heat exchange so as to reduce the heat exchange efficiency.

In almost all of the conventional heat exchangers, the heat exchanging surfaces are chemical conversion-treated with, for example, a chromate treatment, to enhance the resistance to corrosion. The conventional chemical conversion coatings have a low hydrophilicity and thus cannot solve the above-mentioned problems. Also, the conventional chemical conversion coatings are disadvantageous in that they generate an offensive odor.

Further, the conventional heat exchangers have a problem in that microorganism derived from the condensed water and from the dust in the air adhere to the heat exchangers are propagated in the gaps between the fins, and the propagated microorganisms produce metabolic products which generate a putrid odor.

As a method of hydrophilizing the fin surfaces, Japanese Examined Patent Publication (Kokoku) No. 53-48177 discloses a chemical conversion process characterized by treating an aluminum material with an aqueous alkali silicate solution having a specific composition and then heat-drying the treated surface at a temperature of 150° C. or more. Also, Japanese Examined Patent Publication (Kokoku) No. 57-46000 discloses a surface-treatment method characterized in that aluminum-made heat exchanger surfaces are treated with a solution containing porous fine particles and an organic polymeric resin. Further, Japanese Unexamined Patent Publication (Kokai) No. 60-101156 discloses a coating-forming agent for aluminum, characterized by comprising an alkali silicate, a low molecular organic compound having a carbonyl group and a water-soluble organic polymeric compound. In these prior arts, an application of an inorganic hydrophilic compound, for example, a silica sol or an alkali silicate compound to the aluminum material is disclosed.

However, in a pre-coat system in which a coating treatment is applied to a metal material and then the coated metal material is subjected to a forming process, there is a problem that where an aluminum article surface treated with a treatment agent containing the above-mentioned inorganic compound having a high hardness is subjected to an ironing process or perforating process, the processing tools and molds are worn due to high abrasion. Also, the hard coating has no preventive effect on the generation of the offensive odor and on the contrary, promotes the generation of the offensive odor.

To solve the above-mentioned problems, some processes, in which an organic compound-containing treatment liquid free from the inorganic compound, such as the alkali silicate, is used, are provided.

For example, Japanese Unexamined Patent Publication No. 60-219285 discloses an anti-fogging and anti-water drop treatment agent comprising, as principal components, a polyamide having a tert-amine group and/or a polyamide having a polyalkylene glycol group. When this treatment agent is applied, however, the resultant treated metal material exhibits an unsatisfactory durability in hydrophilicity during a long period of use, and the problem that an offensive order, for example, a putrid odor, is generated during a long period of use, is not solved.

As means for preventing the scattering of the condensed water drops and the generation of the offensive odor, Japanese Unexamined Patent Publication No. 61-250495 discloses a process for forming a hydrophilic coating comprising, as a principal component, a water-soluble polyamide resin which exhibits a cationic property in an aqueous solution, on a chemical conversion coating, for example, a chromate coating, formed on a metal material. Also, Japanese Unexamined Patent Publication (Kokai) No. 3-72562, discloses a surface hydrophilization treatment liquid comprising a partially saponified polyvinyl acetate, a water-soluble nylon and a water-soluble amino resin. The above-mentioned treatment process and agent are not always satisfactory in durability in the hydrophilization effect and the offensive-odor-prevention effect.

Japanese Unexamined Patent Publication (Kokai) No. 2-219,875 discloses a hydrophilization coating agent characterized by being produced by copolymerization of four types of $\alpha$ and $\beta$-unsaturated monomers having specific functional groups. This hydrophilization coating agent can reduce the wear of molds used in the forming process. In this publication, it is stated that a polyepoxide which is a glycidyl compound, is used as a cross-linking agent for the copolymer. However, it is difficult to produce the target copolymer from the four monomers having ionic functional groups different in ionic property from each other, and the resultant copolymer is chemically unstable. Therefore, there is a problem in the pot-life of the resultant hydrophilization coating liquid. Also, the resultant coating produced by the treatment of the Japanese publication exhibits substantially no effect on the prevention of the offensive odor generation.

SUMMARY OF THE INVENTION

An object of the present invention is to provide an aqueous hydrophilization treatment composition and method for an aluminum-containing metal material, which treatment composition and method are capable of hydrophilizing the metal material surface without decreasing the heat exchanger efficiency of the metal material due to condensation of water thereon, increasing the scattering of the condensed water, increasing the generation of an offensive odor, and increasing the wear of a mold during the forming process.

Another object of the present invention is to provide an aqueous hydrophilization treatment composition and method for an aluminum-containing metal material, which treatment composition and method can advantageously maintain a high hydrophilicity, an excellent preventing effect on the offensive odor generation, and a satisfactory antibacterial effect on the resultant treated metal material over a long period.

The above-mentioned objects can be attained by the aqueous hydrophilization treatment composition and method of the present invention for an aluminum-containing metal material, and the method of the hydrophilization treatment of the aluminum-containing metal material using the above-mentioned treatment composition.

The aqueous hydrophilization treatment composition of the present invention for an aluminum-containing metal material, comprises:

(A) a glycidyl component comprising at least one water-soluble organic compound having at least one glycidyl group;

(B) a polymeric component comprising at least one member selected from the class consisting of (a) water-soluble polymeric compounds having (i) at least one tert-amino group and (ii) at least one hydrophilic functional group selected from the class consisting of sulfonic, phosphonic, carboxyl, polyalkyleneglycol, hydroxyl, and amide group, and (b) water-soluble polymer-precursory compounds having at least one tert-amino group (i) and at least one hydrophilic functional group (ii) as mentioned above, and capable of being polymerized upon heating and drying; and (C) an antibacterial agent which does not decompose at a temperature of 100° C. or less, said components (A), (B) and (C) being mixed altogether in water.

The method of the present invention for hydrophilization-treating an aluminum-containing metal material, comprises (1) coating a surface of an aluminum-containing metal material with an aqueous treatment liquid comprising an aqueous hydrophilization treatment composition comprising:

(A) a glycidyl component comprising at least one water-soluble organic compound having at least one glycidyl group;

(B) a polymeric component comprising at least one member selected from the class consisting of:

(a) water-soluble polymeric compounds having (i) at least one tert-amino group and (ii) at least one hydrophilic functional group selected from the class consisting of sulfonic, phosphonic, carboxyl, polyalkyleneglycol, hydroxyl, and amide groups, and (b) water-soluble polymer-precursory compounds having the at least one tert-amino group (i) and the at least one hydrophilic functional group (ii) as mentioned above and capable of being polymerized upon heating and drying; and (C) an antibacterial agent which does not decompose at a temperature of 100° C. or less, the components (A), (B) and (C) being mixed altogether in water; and (2) heat-drying the coated aqueous treatment liquid to form a hydrophilic coating on the aluminum-containing metal material surface.

DESCRIPTION OF PREFERRED EMBODIMENTS

The aqueous hydrophilization treatment composition of the present invention comprises (A) a glycidyl component, (B) a polymeric component, and (C) an antibacterial agent, mixed altogether in water.

In the aqueous hydrophilization treatment composition of the present invention, the glycidyl component (A) comprises at least one water-soluble organic compound having one or more glycidyl groups. The water-soluble organic glycidyl compound for the glycidyl component (A) is preferably selected from the class consisting of glycidyl ethers of organic hydroxyl compounds, for example, sorbitolpolyglycidylethers, polyglycerol-polyglycidylethers, pentaerythritol-polyglycidylethers and glycerolpolyglycidylethers; homopolymers and copolymers of glycidyl esters of ethylenically unsaturated carboxylic acids, for example, glycidyl acrylate and glycidyl methacrylate; and glycidyl group-containing water-soluble polymeric compounds, for example, epoxy resins and modified epoxy resins.

In the aqueous hydrophilization treatment composition of the present invention, the polymeric component (B) comprises at least one member selected from the class consisting of (a) water-soluble polymeric compounds having at least one tert-amino group and at least one hydrophilic functional group selected from the class consisting of sulfonic, phosphonic, carboxyl, polyalkylene glycol, hydroxyl and amide groups; and (b) water-soluble organic polymer-precursor compounds having at least one tert-amino group (i) and at least one hydrophilic functional group (ii) as mentioned above, and capable of being polymerized upon heating and drying.

The water-soluble polymeric compounds (a) for the polymeric component (B) are preferably selected from the class consisting of:

copolymers of ① at least one ethylenically unsaturated monomers having at least one tert-amino group with ② least one ethylenically unsaturated monomers having at least one of the hydrophilic functional groups;

copolymers of ① at least one ethylenically unsaturated monomers having at least one tert-amino group with ② at least one ethylenically unsaturated monomers having at least one of the hydrophilic functional groups and ③ at least one ethylenically unsaturated monomers different from the monomers ① and ②;

water-soluble polyamides consisting of polycondensation products of aminoethyl piperazine with polyethyleneglycoldiamine and adipic acid; and tert-amination products of polyvinyl phenols.

The water-soluble, polymerizable organic compounds (b) are preferably selected from the class consisting of tert-amination products of phenolic resins, and tert-amination products of bisphenol resin oligomers.

The ethylenically unsaturated monomers ① having a tert-amino group (i) for the water-soluble polymeric compounds (a) are preferably selected from the class consisting of dimethylaminoethyl acrylate, dimethylaminopropyl methacrylate and alkyldiallylamine.

The ethylenically unsaturated monomers ② having at least one hydrophilic functional group (ii) for the water-soluble polymeric compounds (a) are preferably selected from the class consisting of vinyl sulfonic acid, sulfoethyl methacrylate, 2-acrylamide-2-methylpropanesulfonic acid, vinyl phosphonic acid, acid phosphoxyethyl methacrylate, acrylic acid, methacrylic acid, itaconic acid, polyethyleneglycol acrylate, polyethyleneglycol acrylate-alkylphenyl ether, hydroxyethyl methacrylate, allylalcohol, and acrylamide.

The ethylenically unsaturated monomers ③ different from the monomers ① and ② are preferably selected from acrylic esters and methacrylic esters such as alkyl acrylates and alkyl methacrylates, for example, 2-ethyhexyl acrylate, and methyl methacrylate, and styrene, vinyl toluene, acrylonitrile and vinyl acetate.

The tert-amination of polyvinyl phenols, phenolic resins and bisphenol resin oligomers can be conducted by utilizing a known amination reaction, for example, Mannich reaction or Hofmann reaction.

The water-soluble, polymeric compound (a) and polymerizable compounds (b) for the polymeric component (B) preferably have a tert-amino group and one or two hydrophilic functional groups (ii). If the number of the hydrophilic functional groups (iii) is 3 or more, the resultant water-soluble, polymeric and polymerizable organic compounds (a) and (b) may cause the aqueous hydrophilization treatment liquid to exhibit a reduced stability.

In the aqueous hydrophilization treatment composition of the present invention, the polymeric component (B) comprises one or more members selected from the above-mentioned water-soluble polymeric compounds (a) and water-soluble polymerizable organic compounds (b), and is preferably contained in an amount of 10 to 500 parts by weight, more preferably 50 to 300 parts by weight, per 100 parts by weight of the glycidyl component (A). If the content of the polymeric component (B) is less than 10 parts by weight, the coating formed from the resultant composition may exhibit an unsatisfactory hydrophilicity. Also, if the polymeric component (B) content is more than 500 parts by weight, the resultant coating may exhibit an unsatisfactory water resistance.

In the aqueous hydrophilization treatment composition of the present invention, the antibacterial agent (C) does not decompose at a temperature of 100° C. or less.

Namely, when the aqueous hydrophilization treatment liquid is applied to a surface of an aluminum-containing metal material and heat-dried at an elevated temperature, to remove a solvent consisting of water from the applied treatment liquid layer, the antibacterial agent must be chemically stable at the heat-drying temperature.

The antibacterial agent (C) preferably comprises at least one antibacterial compound selected from the class consisting of 5-chloro-2-methyl-4-isothiazoline-3-one, 2-methyl-4-isothiazoline-3-one, 2-(4-thiocyanomethylthio)-benzothiazole, 2,2-dibromo-3-nitriropropioneamide, sodium-ethylene-bis(dithiocarbamate), sodium-2-pyridinethiol-1-oxide, zinc-2-pyridinethiol-1-oxide, 2,2'-dithio-bis(pyridine-1-oxide), 2,4,5,6-tetrachloroisophthalonitrile, 2-methylcarbonylaminobenzimidazole, 2,3,5,6-tetrachloro-4-(methylsulfonyl)-pyridine, 2-(4-thiazolyl)-benzimidazole, N-(fluorodichloromethylthio) sulfamide, p-chloro-m-xylenol, dehydroacetic acid, o-phenylphenol, 1,2-benzisothiazoline-3-one, 2-bromo-2-nitropropane-1,3-diol barium metaborate, diiodomethyl-p-toluenesulfone, 2-n-octyl-4-isothiazoline-3-one, and 10,10'-oxy-bis(phenoxy) arsine.

The antibacterial agent (C) is contained preferably in a content of 0.1 to 100 parts by weight, per 100 parts by weight of the glycidyl component (A), in the aqueous hydrophilization treatment composition. If the content of the antibacterial agent (C) is less than 0.1 part by weight, the antibacterial effect of the resultant coating may be unsatisfactory. Also, if the content of the antibacterial agent (C) is more than 500 parts by weight, the resultant coating may exhibit an unsatisfactory hydrophilicity.

The antibacterial agent (C) may consist of a single antibacterial compound or a mixture of two or more antibacterial compounds.

Where it is required to store the aqueous hydrophilization treatment composition for 5 to 10 days before using, the pH of the treatment composition is preferably adjusted to a value of 3 to 7. If the value of pH is less than 3.0 or more than 7.0, a storage time of 5 to 10 days causes the glycidyl groups of the water-soluble organic compound in the glycidyl component (A) to react with the tert-amino groups of the water-soluble polymeric compound or the water-soluble, polymerizable organic compound in the polymeric component (B), and thus the desired performance cannot be fully imparted to the aluminum-containing metal material.

The adjustment of the pH value can be effected by using an inorganic acid, for example, phosphoric acid, nitric acid, sulfuric acid or zirconium-hydrofluoric acid, an organic acid having a carboxyl group, an inorganic hydroxide or oxides of an alkali metal or alkaline earth metal, for example, sodium hydroxide, ammonia or an amine compound.

In the aqueous hydrophilization treatment composition of the present invention, the composition medium comprises, as a principal component, water. To control the drying rate, improve the coating properties or enhance the solubility of the components in the composition, the composition medium optionally contains a water-soluble solvent, for example, an aliphatic alcohol, a ketone or a cellosolve.

Also, to enhance the water resistance and corrosion resistance of the resultant hydrophilic coating, the aqueous hydrophilization treatment composition optionally contains a metallic compound, for example, a compound of chromium, zirconium or titanium, for example, $Cr(NO_3)$, $CrF_3$, $Cr(H_2PO_4)_3$, $H_2ZrF_6$ and $H_2TiF_6$.

Also, the aqueous hydrophilization treatment composition optionally contains at least one of a rust-preventive agent, a leveling agent, a filler, a coloring agent, a surfactant and a defoaming agent in an amount in which the resultant coating properties are not affected.

In the aqueous hydrophilization treatment composition of the present invention, the contents of the components (A), (B) and (C) and the viscosity of the composition can be fittingly established in response to the coating method and the desired thickness of the coating. Generally, the thickness of the heat-dried coating formed from the aqueous hydrophilization treatment composition of the present invention on the aluminum-containing metal material surface is preferably 0.05 to 5 $\mu$m, more preferably 0.1 to 2 $\mu$m. If the coating thickness is less than 0.05 $\mu$m, the resultant coating does not impart a sufficient hydrophilicity and a satisfactory offensive odor-preventing effect to the aluminum-containing metal material. Also, if the coating thickness is more than 5 $\mu$m, the resultant coating causes the coated surface of the aluminum-containing metal material to exhibit a reduced heat-conductivity.

The method of the present invention for hydrophilization-treating an aluminum-containing metal material comprises the steps of:

(1) coating a surface of an aluminum-containing metal material with an aqueous treatment liquid comprising the above-mentioned aqueous hydrophilization composition; and (2) heat-drying the coated aqueous treatment liquid to form a hydrophilic coating on the aluminum-containing metal material surface.

The aqueous treatment liquid preferably has a total content of the components (A), (B) and (C) of 0.5 to 20% by weight, more preferably 1 to 10% by weight.

The aluminum-containing metal material is selected from aluminum metal materials and aluminum alloy materials which may be in the form of sheets, strips, plates and other shaped articles, for examples, tubes, fins, hollow plates, usable, for example, for heat exchangers such as air conditioners. The aluminum alloy may be selected from, for example, aluminum-magnesium alloys, aluminum-silicon alloys and aluminum-manganese alloys.

The aluminum-containing metal material is preliminarily degreased and surface-treated by a chemical conversion treatment agent or an organic polymeric primer. The pretreated aluminum-containing metal material is subjected to the method of the present invention in which the aqueous treatment liquid containing the aqueous hydrophilization treatment composition is applied to the aluminum-containing metal material and then heat-dried.

The chemical conversion treatment is preferably selected from a chromic acid-chromate treatment, a phosphoric acid-chromate treatment and a zirconium phosphate treatment.

In the method of the present invention, there is no limitation to the coating method of the aqueous treatment liquid. Namely, the coating procedure can be carried out by immersion, spraying, brush-coating, roll-coating or flow coating methods. Also, there is no limitation to the heat-drying method. Usually, the heat-drying step is carried out by using a hot air dryer. The drying temperature is preferably from 80 to 300° C., more preferably from 100 to 250° C. and is established at a level at which the antibacterial agent (C) is not deteriorated.

The hydrophilic coating formed on the aluminum-containing metal material surface in accordance with the method of the present invention using the aqueous hydrophilization treatment composition exhibits excellent hydrophilicity, a preventing effect on offensive odor generation and an antibacterial effect over a long time period, and is thus suitable as a coating for heat exchangers made from aluminum-containing metal materials.

When the aqueous hydrophilization treatment composition coated on the aluminum-containing metal material surface is heat-dried, the glycidyl component (A) comprising the water-soluble organic compound having the glycidyl group is polymerized to form a dense three-dimensional structure by a catalytic performance of the tert-amine groups of the water-soluble polymeric compound (a) or the water-soluble polymerizable compound (b) in the polymeric component (B). The tert-amino groups of the polymeric component (B) not only catalytically promote the polymerization of the glycidyl component (A) by the reaction between the glycidyl groups, but also react with the glycidyl groups of the glycidyl component (A) so as to fix the polymeric component (B) in the resultant coating. In the fixed polymeric component (B) in the coating, the water-soluble polymeric compound (a) or the polymer derived from the water-soluble polymerizable compound (b) has, in addition to the tert-amino group, at least one hydrophilic functional group selected from sulfonic, phosphonic, carboxyl, polyalkyleneglycol, hydroxyl and amide groups, and thus exhibits an excellent hydrophilicity over a long period.

Also, the resultant coating comprising the polymers derived from the glycidyl component (A) and the polymeric component (B) and having the three-dimensional structure exhibits an excellent water-resistance and thus a superior resistance to deterioration over a long period. Thus, the exposure of the aluminum-containing metal material surface or the chemical conversion coating surface to the environment can be prevented by the hydrophilic coating. Accordingly, the generation and scattering of dust and offensive odor which are assumed to be derived from aluminum oxide, aluminum hydroxide and deterioration (decomposition) products of the chemical conversion coating, can be prevented over a long period.

In the hydrophilic coating formed in accordance with the present invention, the antibacterial agent (C) is uniformly dispersed in the matrix consisting of the polymers derived from the glycidyl component (A) and the polymeric component (B) and continuously exhibits an antibacterial performance so as to prevent the production of bacterial metabolite and the generation of fungal putrefaction odor over a long period.

The coating formed from the aqueous hydrophilization treatment composition of the present invention is a polymeric coating, and thus has an excellent formability.

EXAMPLES

The present invention will be further explained by the following examples which are merely representative and do not restrict the scope of the present invention in any way.

Example 1

An aluminum sheet (JIS-A1100, 70 mm×150 mm, thickness: 0.12 mm) was immersed in an aqueous solution of 30 g/liter of a weak alkaline degreasing agent (trademark: Fine Cleaner 315, made by Nihon Parkerizing Co.) at a temperature of 60° C. for 90 seconds, and rinsed with tap water, to remove the soil from the sheet. Then the cleaned aluminum sheet was immersed in an aqueous solution of 72 g/liter of a chromic acid-chromate treatment liquid (trademark: Alchrom 713, made by Nihon Parkerizing Co.) at a temperature of 50° C. for 60 seconds and rinsed with tap water, to form a chromate chemical conversion coating.

An aqueous hydrophilization treatment liquid containing the following composition in a nonvolatile (solid) content of 2% by weight was prepared and the pH of the treatment liquid was adjusted to 4.5 by using an aqueous phosphoric acid solution.

|  | Component | Nonvolatile content (part by weight) |
|---|---|---|
| Component (A): | Pentaerythritoltetra-glycidylether | 100 |
| Component (B): | Terpolymer of 30 molar % of dimethylamimoethyl methacrylate with 30 molar % of sodium vinyl sulfonate and 40 molar % of acrylamide | 20 |
| Component (C): | 2-bromo-2-nitropropane-1,3-diol | 0.5 |

The chromate chemical conversion coated aluminum sheet was immersed in the aqueous treatment liquid at a temperature of 25° C. for 10 seconds. The aluminum sheet was withdrawn from the treatment liquid and heat-dried in an air-circulating oven controlled to a temperature of 180° C. for 5 minutes.

Example 2

The same procedures as in Example 1 were carried out with the following exceptions.

The aqueous hydrophilization treatment liquid contained the following composition in a nonvolatile content of 2% by weight, and the pH value of the treatment liquid was adjusted to 5.0 by using an aqueous zircohydrofluoric acid solution.

| | Component | Nonvolatile content (part by weight) |
| --- | --- | --- |
| Component (A): | Water-soluble, epoxy-modified polyamide | 100 |
| Component (B): | Water-soluble nylon (*)$_1$ | 200 |
| Component (C): | Zinc-2-pyridinmethiol 1-oxide | 10 |
| Surfactant (*)$_2$ | | 0.5 |

Note: (*)$_1$ . . .A polycondensation product of aminoethylpiperazine with polyethyleneglycoldiamine and adipic acid
(*)$_2$. . .Trademark: Adecanol B-4009, made by Asahi Denka Kogyo K.K.

Example 3

The same procedures as in Example 1 were carried out with the following exceptions.

An Al-Mn alloy (JIS A 3004, 70 mm×150 mm, thickness: 0.12 mm) was degreased in the same manner as in Example 1, immersed in an aqueous phosphoric acid-chromate treatment liquid containing 47 g/liter of Alchrom 702 (trademark, Nihon Parkerizing Co.) and 500 ppm of hydrofluoric acid at a temperature of 50° C. for 30 seconds, and rinsed with tap water, to form a phosphoric acid-chromate chemical conversion coating.

An aqueous hydrophilization treatment liquid was prepared by diluting the following composition to a nonvolatile content of 2% by weight with water and the pH value of the treatment liquid was adjusted to 3.5 by using an aqueous nitric acid solution.

| | Component | Nonvolatile content (part by weight) |
| --- | --- | --- |
| Component (A): | Glycerolpolyglycidylether | 100 |
| Component (B): | Copolymer of 40 molar % of dimethylaminopropyl acrylate with 60 molar % of acrylic acid | 100 |
| Component (C): | 1,2-benzisothazoline-3-one | 10 |
| Surfactant: | Adecanol B 4009 (trademark) | 0.5 |

In the hydrophilization treatment, the heat-drying procedure was carried out at a temperature of 140° C. for 5 minutes.

Example 4

The same procedures as in Example 3 were carried out with the following exceptions.

The aqueous hydrophilization treatment liquid contained the following composition in a nonvolatile content of 5% by weight and the pH value of the treatment liquid was adjusted to 6.0 by using an aqueous phosphoric acid solution.

| | Component | Nonvolatile content (part by weight) |
| --- | --- | --- |
| Component (A): | Sorbitolpolyglycidylether | 100 |
| Component (B): | Copolymer of 50 molar % of dimethylaminopropyl acrylate with 50 molar % of 2 hydroxy-ethyl methacrylate | 30 |
| | Water soluble nylon (*)$_3$ | 70 |
| Component (C): | 2-n-octyl-4-isothiazoline-3-one | 2 |

Note:(*)$_3$. . .A polycondensation product of aminoethylpiperazine with adipic acid and ε-caprolactam

Example 5

An aluminum sheet (JIS A1100, 70 mm×150 mm, thickness: 0.12 mm) was immersed in an aqueous cleaning liquid containing 20 g/liter of a moderate alkaline degreasing agent (trademark: Fine cleaner 4306, made by Nihon Parkerizing Co.) at a temperature of 70° C. for 10 seconds and rinsed with water, to remove soil from the aluminum sheet, and then dried at a temperature of 80° C. for 30 seconds.

Then, an aqueous pre-treatment liquid consisting of a mixture of 70 g of an acrylic resin primer (trademark: Paltop 3977-2A, made by Nihon Parkerizing Co.) with 30 g of another acrylic resin primer (trademark: Paltop 3977-2B, made by Nihon Parkerizing Co.) was coated in an amount of 1.5 g/m$^2$ on the surface of the cleaned aluminum sheet by using a bar coater No. 3, and then heat-dried at a temperature of 200° C. for 10 seconds.

An aqueous hydrophilization treatment liquid was prepared by diluting the following composition to a nonvolatile content of 10% by weight with water, and the pH of the treatment liquid was adjusted to 5.0 by using an aqueous phosphoric acid solution.

| | Component | Nonvolatile content (part by weight) |
| --- | --- | --- |
| Component (A): | Sorbitolpoly-glycidylether | 100 |
| Component (B): | Water-soluble nylon (*)$_1$ | 100 |
| | Water-soluble, tert-aminated phenolic resin | 200 |
| Component (C): | 2-(4-thiocyano-methylthio)benzo-thiazole | 4 |

Example 6

The same procedures as in Example 5 were carried out with the following exceptions.

The aqueous hydrophilization treatment liquid contained the following composition in a nonvolatile content of 7% by weight, and had a pH value of 4.0 adjusted by using an aqueous phosphoric acid solution.

| Component | | Nonvolatile content (part by weight) |
|---|---|---|
| Component (A): | Water-soluble, epoxy-modified polyamide | 50 |
| | Copolymer of 30 molar % of glycidyl-methacrylate with 70 molar % of acrylamide | |
| Component (B): | Copolymer of 40 molar % of dimethyl-aminoethyl methacrylate with 60 molar % of acrylic acid | 20 |
| Component (C): | 5-chloro-2-methyl-4-isothiazoline-3-one | 1 |
| | 2-methyl-4-isothiazoline-3-one | 1 |
| Surfactant: | Adecanol B-4009 (trademark) | 0.5 |

Comparative Example 1

The same procedures as in Example 1 were carried out except that the glycidyl component (A) consisting of pentaerytritoltetraglycidylether was ommited from the aqueous hydrophilization treatment liquid.

Comparative Example 2

The same procedures as in Example 2 were carried out except that the polymeric component (A) consisting of the water-soluble nylon was omitted from the aqueous hydrophilization treatment liquid.

Comparative Example 3

The same procedures as in Example 2 were carried out except that the antibacterial agent (c) consisting of 1,2-benzisothiazoline-3-one was omitted from the aqueous hydrophilization treatment liquid.

Comparative Example 4

The same procedures as in Example 5 were carried out with the following exception.

The aqueous hydrophilization treatment liquid contained a treatment composition comprising 50 parts by solid weight of colloidal silica (trademark: Snowtex C, made by Nissan Kagaku Kogyo K. K.), 50 parts by weight of sodium silicate (grade No. 3) and 50 parts by weight of sodium polyacrylate (trademark: Julimer AC 10N, made by Nihon Junyaku K. K.) in a total nonvolatile content of 5% by weight.

Tests

The hydrophilized aluminum or aluminum alloy sheets produced in Examples 1 to 6 and Comparative Examples 1 to 4 were subjected to the following tests.

(1) Hydrophilicity

A specimen was treated by immersing in flowing water at room temperature for 8 hours and drying at a temperature of 80° C. for 16 hours. The treatment was repeated 5 times. The water-treated specimen was subjected to a measurement of a water contact angle by using a contact angle tester (trademark: Face Contact Angle Tester CA-P, made by Kyowa Kaimenkagaku K. K.)

(2) Preventability of Offensive Odor Generation

A specimen was immersed in flowing water at room temperature for 8 hours, and dried at a temperature of 80° C. for 16 hours. The treatment was repeated 5 times. The water-treated specimen was exposed to deionized water vapor for about one second, and immediately the odor of the specimen was evaluated as follows.

| Class | Test result |
|---|---|
| 3 | No odor was detected |
| 2 | A weak odor was detected |
| 1 | A significant odor was detected |

(3) Antibacterial Performance

A specimen was immersed in flowing water at room temperature for 8 hours and then dried at a temperature of 80° C. for 16 hours. The treatment was repeated 5 times. The specimen was cut into square pieces of 3 cm×3 cm.

In a bacteria-culturing test, Nutrient Broth was coated as a nutrient source on the test piece surfaces, and in a fungi-culturing test, a mixture of peptone with glucose in a mixing weight ratio of 1:1 was coated on the test piece surfaces.

An aqueous suspension containing the bacteria or fungi indicated below was sprayed to the test piece surfaces and the bacteria or fungi were cultured at a temperature of 30±2° C. for 14 days.

Bacteria:
  *Escherichia coli*, *Bacillus subtilis*, and *Pseudomonas aeruginosa*

Fungi:
  *Aspergillus niger*, *Penicillium citrinum*, and *Cladosporium cladosporioides*

After culturing, the bacteria or fungi are extracted from the test pieces to a sterilized water, and the number of the bacterial or fungi was determined by a dilute-culturing method.

The test results were evaluated as follows.

| Class | The number of bacteria or fungi |
|---|---|
| 3 | Less than $10^2/m^2$ |
| 2 | $10^2/m^2$ or more but less than $10^5/m^2$ |
| 1 | $10^5/m^2$ or more |

(4) Formability

A surface of a specimen was coated with a volatile press oil (trademark: Press Oil AF-2A, made by Idemitsu Sekiyu Kagaku K. K.) and a punching press operation using a piercing punch was applied to the specimen 100,000 times. Then the surface of the piercing punch was observed by a scanning electron microscope to measure the amount of wear of the piercing punch. The test result are evaluated as follows.

| Class | Amount of wear |
|---|---|
| 3 | Substantially no wear |
| 2 | Slightly worn |
| 1 | Greatly worn |

In Table 1, the procedure conditions of Examples 1 to 6 are shown. In Table 2, the procedure conditions of Comparative Examples 1 to 4 are shown. Also, in Table 3, the test results of Examples 1 to 6 and Comparative Examples 1 to 4 are shown.

TABLE 1

| | | | Hydrophilization treatment | | | | | |
| | | | Polymeric component (B) | | Antibacterial agent (C) | | | Heat-drying condition | |
| Example No. | Glycidyl component (A) 100 parts by weight | | Compound | Amount (part by weight) | Compound | Amount (part by weight) | Additive | Temperature (° C.) | Time (min) |
|---|---|---|---|---|---|---|---|---|---|
| | | | Chemical conversion pre-treatment | | | | | | |
| 1 | Chromic acid-chromate | Pentaerythritol-tetraglycidyl-ether | Terpolymer of dimethylaminoethyl methacrylate (30 mol %) with sodium vinylsulfonate (30 mol %) and acrylic amide (40 mol %) | 20 | 2-bromo-2-nitropropane-1,3-diol | 0.5 | Phosphoric acid | 180 | 5 |
| 1 | Chromic acid-chromate | Water-soluble, epoxy-modified polyamide | Water-soluble nylon (*)₁ | 200 | Zinc-2-pyridine-thiol-oxide | 10 | Zircohydrofluoric acid and Surfactant | 180 | 5 |
| 3 | Phosphoric acid-chromate | Glycerolpolyglycidylether | Copolymer of dimethylaminopropyl acrylate (40 mol %) with acrylic acid (60 mol %) | 100 | 1,2-benzisothiazoline-3-one | 10 | Surfactant and Nitric acid | 140 | 5 |
| 4 | Phosphoric acid-chromate | Sorbitolpolyglycidylether | Copolymer of dimethylaminopropyl acrylate (50 mol %) with 2-hydroxyethyl methacrylate (50 mol %) Water-soluble nylon (*)₃ | 30 70 | 2-n-octyl-4-isothiazoline-3-one | 2 | Phosphoric acid | 140 | 5 |
| | | | Primer pre-treatment | | | | | | |
| 5 | Acrylic resin | Sorbitolpolyglycidylether | Water-soluble nylon (*)₁ tert-aminated phenolic resin | 100 200 | 2-(4-thiocyanomethylthiobenzothiazole | 4 | Phosphoric acid | 200 | 10 sec. |
| 6 | Acrylic resin | Water-soluble, epoxy-modified polyamide: 5.0 parts by weight Copolymer of glycidyl methacrylate (30 mol %) with acrylamide (70 mol %): 50 parts by weight | Copolymer of dimethylaminoethyl methacrylate (40 mol %) with acrylic acid (60 mol %) | 20 | 5-chloro-2-methyl-4-isothiazoline 3-one 2-methyl-4-isothiazoline-3-one | 1 1 | Phosphoric acid and Surfactant | 200 | 10 sec. |

Note: (*)₁ Polycondensation product of aminoethylpiperazine with polyethyleneglycoldiamine and adipic acid
(*)₃ Polycondensation product of aminoethylpiperazine with adipic acid and ε-caprolactam

TABLE 2

| | | | Hydrophilization treatment | | | | | |
| | | | Polymeric component (B) | | Antibacterial agent (C) | | | Heat-drying condition | |
| Comparative Example No. | Pre-treatment | Glycidyl component (A) 100 parts by weight | Compound | Amount (part by weight) | Compound | Amount (part by weight) | Additive | Temperature (° C.) | Time (min) |
|---|---|---|---|---|---|---|---|---|---|
| 1 | Chromic acid-chromate | None | Terpolymer of dimethylamino-ethyl methacrylate (30 mol %) with sodium | 20 | 2-bromo-2-nitro-propane-1,3-diol | 0.5 | Phosphoric acid | 180 | 5 |

TABLE 2-continued

<table>
<tr><th colspan="9">Hydrophilization treatment</th></tr>
<tr><th rowspan="3">Comparative Example No.</th><th rowspan="3">Pre-treatment</th><th colspan="3">Polymeric component (B)</th><th colspan="2">Antibacterial agent (C)</th><th rowspan="3">Additive</th><th colspan="2">Heat-drying condition</th></tr>
<tr><th rowspan="2">Glycidyl component (A) 100 parts by weight</th><th rowspan="2">Compound</th><th>Amount (part by weight)</th><th rowspan="2">Compound</th><th>Amount (part by weight)</th><th>Temperature (° C.)</th><th>Time (min)</th></tr>
<tr></tr>
<tr><td>2</td><td>Chromic acid-, chromate</td><td>Water-soluble, epoxy-modified polyamide</td><td>vinylsulfonate (30 mol %) and acrylamide (40 mol %) None</td><td></td><td>Zinc-2-pyridine-thiol-1-oxide</td><td>10</td><td>Zirco-hydro-fluoric acid and Surfactant</td><td>180</td><td>5</td></tr>
<tr><td>3</td><td>Phosphoric acid-chromate</td><td>Glycerolpoly-glycidylether</td><td>Copolymer of dimethylaminopropyl acrylate with acrylic acid (60 mol %)</td><td>100</td><td>None</td><td></td><td>Surfactant and Nitric acid</td><td>140</td><td>5</td></tr>
<tr><td>4</td><td>Acrylic resin</td><td colspan="2">Colloidal silica and alkali silicate</td><td></td><td>None</td><td></td><td>None</td><td>200</td><td>10 sec.</td></tr>
</table>

TABLE 3

| Example No. | | Hydrophilicity (water contact angle, degree) | Preventability of offensive odor generation | Anti-bacterial performance | Forma-bility |
|---|---|---|---|---|---|
| Example | 1 | 15 | 3 | 3 | — |
|  | 2 | 18 | 3 | 3 | — |
|  | 3 | 12 | 3 | 3 | 3 |
|  | 4 | 18 | 3 | 3 | — |
|  | 5 | 15 | 3 | 3 | 3 |
|  | 6 | 20 | 3 | 3 | 3 |
| Comparative | 1 | 39 | 1 | 1 | — |
| Example | 2 | 53 | 2 | 1 | — |
|  | 3 | 17 | 3 | 1 | — |
|  | 4 | 20 | 2 | 2 | 1 |

Table 4 clearly shows that the hydrophilized aluminum-containing metal materials produced in Examples 1 to 6 exhibited excellent hydrophilicity, prevention of offensive odor generation and antibacterial performance, even under durability test conditions, and a satisfactory formability. Compared with these products, in Comparative Example 2 in which no glycidyl component (A) was employed and Comparative Example 2 in which no polymeric component (B) was employed, the resultant hydrophilic coatings exhibited a poor durability and are unsatisfactory in the hydrophilicity, the prevention of offensive odor generation and antibacterial performance. Also, in Comparative Example 3 wherein no antibacterial agent (C) was employed, the resultant coating exhibited a poor antibacterial performance. Further, in Comparative Example 4 wherein the mixture of colloidal silica and silicate was employed in place of the hydrophilization treatment composition of the present invention, the resultant product exhibited a poor formability.

In view of the results of the examples and comparative examples, it is clear that the aqueous hydrophilization treatment composition and method of the present invention can form a hydrophilic coating having excellent hydrophilicity, which prevents offensive odor generation, and has good antibacterial performance, formability and durability in practical use, on an aluminum-containing metal material, and is industrially useful.

What is claimed is:
1. An aqueous hydrophilization treatment composition for an aluminum-containing metal material, comprising:
(A) a water-soluble glycidyl component comprising at least one member selected from the group consisting of sorbitolpolyglycidylether, polyglycerolpolyglycidylether, pentaerythritolpolyglycidylether, glycerolpolyglycidylether, homo- and copolymers of glycidyl acrylate, homo- and copolymers of glycidyl methacrylate, epoxy resins and modified epoxy resins;
(B) a water-soluble polymeric component comprising at least one member selected from the group consisting of polycondensation products of aminoethyl piperazine with polyethyleneglycoldiamine and adipic acid, tert-amination products of polyvinyl phenols, tert-amination products of phenol resins, and tert-amination products of bisphenol resin oligomers; and
(C) an antibacterial agent which does not decompose at a temperature of 100° C. or less, and is selected from the group consisting of 5-chloro-2-methyl-4-isothiazoline-3-one, 2-methyl-4-isothiazoline-3-one, 2-(4-thiocyanomethylthio)-benzothiazole,2,2-dibromo-3-nitriropropioneamide, sodium-ethylene-bis (dithiocarbamate), sodium-2-pyridinethiol-1-oxide, zinc-2-pyridinethiol-1-oxide, 2,2'-dithio-bis(pyridine-1-oxide),2,4,5,6-tetrachloroisophthalonitrile, 2-methylcarbonylaminobenzimidazole, 2,3,5,6-tetrachloro-4-(methylsulfonyl)-pyridine, 2(4-thiazolyl)-benzimidazole, N-(fluorodichloromethylthio)sulfamide, p-chloro-m-xylenol, dehydroacetic acid, o-phenylphenol, 1,2-benzisothiazolne-3-one, 2-bromo-2-nitropropane-1,3-diol barium metaborate, diiodomethyl-p-toluenesulfone, 2-n-octyl-4isothiazoline-3-one, and 10,10'-oxy-bis(phenoxyarsine),
in which composition:
the polymeric component (B) is present in an amount of 10 to 500 parts by weight, and the antibacterial agent

(C) is present in an amount of 0.1 to 100 parts by weight, per 100 parts by weight of the glycidyl component (A);

the components (A), (B) and (C) are mixed altogether in water; and the composition has a pH value of 3 to 7.

2. The aqueous hydrophilization treatment composition as claimed in claim 1, further comprising a compound of a metal selected from the class consisting of chromium, zirconium and titanium.

* * * * *